United States Patent
Albert et al.

(10) Patent No.: US 10,273,935 B2
(45) Date of Patent: Apr. 30, 2019

(54) ROTOR BLADES HAVING STRUCTURAL SKIN INSERT AND METHODS OF MAKING SAME

(71) Applicant: General Electric Company, Schenectady, NY (US)

(72) Inventors: Bensely Albert, Greenville, SC (US); Amir Riahi, Greenville, SC (US)

(73) Assignee: General Electric Company, Schenectady, NY (US)

( * ) Notice: Subject to any disclaimer, the term of this patent is extended or adjusted under 35 U.S.C. 154(b) by 567 days.

(21) Appl. No.: 14/996,256

(22) Filed: Jan. 15, 2016

(65) Prior Publication Data

US 2017/0204833 A1   Jul. 20, 2017

(51) Int. Cl.
| | |
|---|---|
| *F03D 1/06* | (2006.01) |
| *B29C 70/00* | (2006.01) |
| *B29K 309/08* | (2006.01) |
| *B29L 31/08* | (2006.01) |

(52) U.S. Cl.
CPC ............ *F03D 1/0675* (2013.01); *B29C 70/00* (2013.01); *B29K 2309/08* (2013.01); *B29L 2031/08* (2013.01); *F05B 2230/23* (2013.01); *F05B 2230/31* (2013.01); *F05B 2240/2211* (2013.01); *F05B 2250/18* (2013.01); *F05B 2280/4007* (2013.01); *F05B 2280/6003* (2013.01); *F05B 2280/6012* (2013.01); *F05B 2280/6015* (2013.01)

(58) Field of Classification Search
CPC ...... F03D 1/0675; F03D 1/065; F03D 1/0666; F03D 3/06; F03D 3/061; F03D 3/062; F05B 2230/23; F05B 2230/31; F05B 2240/2211; F05B 2250/18; F05B 2280/4007; F05B 2280/6003; F05B 2280/6012; F05B 2280/6015
See application file for complete search history.

(56) References Cited

U.S. PATENT DOCUMENTS

| | | | | |
|---|---|---|---|---|
| 2,793,718 | A | * 5/1957 | Pajak | ............... E04C 2/365 228/170 |
| 4,012,882 | A | * 3/1977 | Juriss | ............... C22C 27/04 428/73 |
| 4,937,125 | A | 6/1990 | Sanmartin et al. | |
| 5,112,663 | A | 5/1992 | Morenz et al. | |

(Continued)

FOREIGN PATENT DOCUMENTS

| | | |
|---|---|---|
| DE | 19706689 A1 | 8/1998 |
| WO | WO2005/035217 A1 | 4/2005 |

*Primary Examiner* — Aaron R Eastman
(74) *Attorney, Agent, or Firm* — Dority & Manning, P.A.

(57) ABSTRACT

The present disclosure is directed to a method of manufacturing a rotor blade for a wind turbine. The method includes providing a blade mold of the rotor blade. Another step includes placing an outer skin layer in the blade mold. The method also includes placing one or more structural inserts in the blade mold atop the outer skin layer as a function of a load of the rotor blade. Further, each of the structural inserts includes a plurality of cells arranged in a predetermined pattern. Further, the cells have varying cell sizes. The method also includes placing an inner skin layer atop the one or more structural inserts and securing the outer skin layer, the one or more structural inserts, and the inner skin layer together to form the rotor blade.

14 Claims, 11 Drawing Sheets

(56) References Cited

U.S. PATENT DOCUMENTS

| | | | |
|---|---|---|---|
| 5,876,652 A | 3/1999 | Rorabaugh et al. | |
| 6,187,411 B1 | 2/2001 | Palmer | |
| 6,673,415 B1 | 1/2004 | Yamazaki et al. | |
| 6,740,381 B2 | 5/2004 | Day et al. | |
| 6,824,851 B1 | 11/2004 | Locher et al. | |
| 7,393,577 B2 | 7/2008 | Day et al. | |
| 7,851,048 B2 | 12/2010 | Brandon et al. | |
| 7,951,449 B2 | 5/2011 | Ma et al. | |
| 7,972,698 B2 | 7/2011 | Miller et al. | |
| 7,998,299 B2 | 8/2011 | McCarville et al. | |
| 8,062,728 B2 * | 11/2011 | De Baets | B32B 3/12 428/117 |
| 8,097,106 B2 | 1/2012 | Hand et al. | |
| 8,114,501 B2 | 2/2012 | Brandon et al. | |
| 8,157,937 B2 | 4/2012 | Brandon et al. | |
| 8,389,104 B2 | 3/2013 | Day et al. | |
| 8,419,883 B2 | 4/2013 | Day et al. | |
| 8,431,214 B2 | 4/2013 | Chakrabarti | |
| 8,475,894 B2 | 7/2013 | Noble et al. | |
| 8,512,853 B2 | 8/2013 | Chakrabarti | |
| 8,636,252 B2 | 1/2014 | Pook et al. | |
| 8,642,168 B2 | 2/2014 | Chakrabarti | |
| 8,646,183 B2 | 2/2014 | Tompkins et al. | |
| 8,663,791 B2 | 3/2014 | Day et al. | |
| 8,815,038 B2 | 8/2014 | McCarville et al. | |
| 8,834,667 B2 | 9/2014 | McCarville et al. | |
| 9,186,863 B2 | 11/2015 | Day et al. | |
| 2002/0106503 A1 | 8/2002 | Monk et al. | |
| 2004/0253407 A1 * | 12/2004 | Shah | B32B 3/12 428/73 |
| 2007/0256379 A1 * | 11/2007 | Edwards | B32B 5/18 52/309.9 |
| 2011/0142670 A1 * | 6/2011 | Pilpel | F03D 3/062 416/230 |
| 2011/0244213 A1 | 10/2011 | Jones | |
| 2011/0281114 A1 | 11/2011 | Butler | |
| 2012/0238168 A1 | 9/2012 | Tompkins et al. | |
| 2012/0301665 A1 | 11/2012 | Mortimer et al. | |
| 2013/0196175 A1 | 8/2013 | Levit et al. | |
| 2013/0243998 A1 * | 9/2013 | Preuss | B29C 70/865 428/116 |
| 2013/0251935 A1 * | 9/2013 | Day | B29C 70/086 428/71 |
| 2013/0284357 A1 | 10/2013 | Noble | |
| 2014/0246151 A1 | 9/2014 | Passmann et al. | |
| 2014/0272247 A1 | 9/2014 | Latz et al. | |
| 2015/0151509 A1 * | 6/2015 | Tompkins | B32B 5/145 428/158 |
| 2017/0233997 A1 * | 8/2017 | Stevenson | E04B 1/34357 29/426.2 |

* cited by examiner

ROTOR BLADES HAVING STRUCTURAL SKIN INSERT AND METHODS OF MAKING SAME

FIELD OF THE INVENTION

The present subject matter relates generally to wind turbines and, more particularly, to wind turbine rotor blades having structural skin inserts and methods of making same.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Wind turbine rotor blades generally include a body shell formed by two shell halves of a composite laminate material. The shell halves are generally manufactured using molding processes and then coupled together along the corresponding edges of the rotor blade. In general, the body shell is relatively lightweight and has structural properties (e.g., stiffness, buckling resistance and strength) which are not configured to withstand the bending moments and other loads exerted on the rotor blade during operation. Thus, to increase the stiffness, buckling resistance, and/or strength of the rotor blade, the body shell is typically reinforced using one or more structural components (e.g. opposing spar caps with a shear web configured therebetween) that engage the inner surfaces of the shell halves.

Wind turbine blades are becoming increasingly longer in order to produce more power. As a result, the blades must be stiffer and thus heavier so as to mitigate loads on the rotor. Such increases, however, require increased spar cap strength to support the load of the blade. In addition, the larger blade shells require intrinsic strength to support the weight of the blade.

Accordingly, there is a need for improved wind turbine rotor blades that address the aforementioned issues. Thus, the present invention is directed to a rotor blades and methods of making same having structural inserts or panels having varying cell sizes to accommodate loads of the blade.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method of manufacturing a rotor blade for a wind turbine. The method includes providing a blade mold of the rotor blade. Another step includes placing an outer skin layer in the blade mold. The method also includes placing one or more structural inserts in the blade mold atop the outer skin layer. Further, each of the structural inserts includes a plurality of cells arranged in a predetermined pattern. Further, the cells have varying cell sizes. The method also includes placing an inner skin layer atop the one or more structural inserts and securing the one or more structural inserts between the outer and inner skin layers so as to form the rotor blade. In addition, where the blade mold includes a blade half, the method may include joining the blades halves together.

In one embodiment, the method may include filling the plurality of cells of the structural insert(s) with a filler material. More specifically, in certain embodiments, the filler material may include a low-density foam material. In another embodiment, outer and inner skin layers may include at least one of a dry fabric or a pre-preg material.

In another embodiment, the predetermined pattern may include any suitable pattern having number of cells of varying sizes. For example, in certain embodiments, the predetermined may have a dragon fly pattern, a hexagonal pattern, a square pattern, a rectangular pattern, a flex core pattern, a random pattern, or similar. Thus, the individual cells may also have any suitable cross-sectional shape so as to form the desired predetermined pattern.

In further embodiments, the method may also include forming the structural insert(s) via any suitable manufacturing process, such as for example, three-dimensional (3D) printing. In additional embodiments, the structural insert(s) may be constructed of any suitable material, including but not limited to a glass fiber reinforced polymer (GFRP), a thermoset material, a thermoplastic material, a metal, or similar. More specifically, in certain embodiments, the structural insert(s) may be constructed of engineered thermoplastics, acrylonitrile butadiene styrene (ABS), polycarbonate (PC), and/or commodity plastics like polyethylene, polypropylene, or similar. In addition, the structural insert(s) may be fiber reinforced or particle reinforced.

In yet another embodiment, the method may also include forming the structural insert from a plurality of structural panels, with each of the panels having a different predetermined pattern. More specifically, the plurality of cells of at least one of the structural inserts may be larger than the plurality of cells of another structural insert. Alternatively, each of the structural panels may have matching predetermined patterns. In further embodiments, the predetermined patterns of the plurality of structural inserts may include a combination of different and matching predetermined patterns.

In additional embodiments, the step of securing the one or more structural inserts between the outer and inner skin layers may include infusing the one or more structural inserts between the outer and inner skin layers together via vacuum infusion using a resin material, e.g. where the outer and inner skin layers are dry fabrics. Alternatively, the step of securing the one or more structural inserts between the outer and inner skin layers may include heat curing the structural inserts between the outer and inner skin layers, e.g. where the outer and inner skin layers are pre-preg materials.

In another aspect, the present disclosure is directed to a rotor blade of a wind turbine. The rotor blade includes an outer skin layer, an inner skin layer, one or more structural inserts sandwiched between the outer and inner skin layers, and a cured resin material securing the one or more structural inserts between the outer and inner skin layers. Further, each of the structural inserts includes a plurality of cells arranged in a predetermined pattern. In addition, the cells have varying cell sizes. It should also be understood that the rotor blade may further include any of the additional features as described herein.

In yet another aspect, the present disclosure is directed to a method of manufacturing a rotor blade for a wind turbine.

The method includes providing a blade mold of the rotor blade. The method also includes placing at least one skin layer in the blade mold. Another step includes placing one or more structural inserts in the blade mold adjacent to the skin layer. Each of the structural inserts includes a plurality of cells arranged in a predetermined pattern. Further, the cells have varying cell sizes. The method also includes securing the skin layer and the one or more structural inserts together to form the rotor blade. It should also be understood that the method may further include any of the additional steps and/or features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a structural reinforcement insert or panel for a wind turbine rotor blade shell and methods of making same. For example, in one embodiment, the method includes placing an outer skin layer in a blade mold of the rotor blade and placing one or more of the structural inserts in the blade mold atop the outer skin layer. Thus, a number of structural inserts may be determined as a function of a load of the rotor blade. In addition, each of the structural inserts includes a plurality of cells arranged in a predetermined pattern. Further, the cells have varying cell sizes, i.e. either varying cross-sectional areas or volumes. The method also includes placing an inner skin layer atop the structural insert(s) and securing the structural insert(s) between the outer and inner skin layers so as to form the rotor blade.

The present disclosure provides many advantages not present in the prior art. For example, the structural reinforcement skin inserts of the present disclosure provide improved load bearing capacity and stiffness to wind turbine rotor blades. In addition, the aero-elastic function requirement of rotor blades can be tuned for the blade with respect to geometry and/or location of the structural insert(s).

Figure 1:
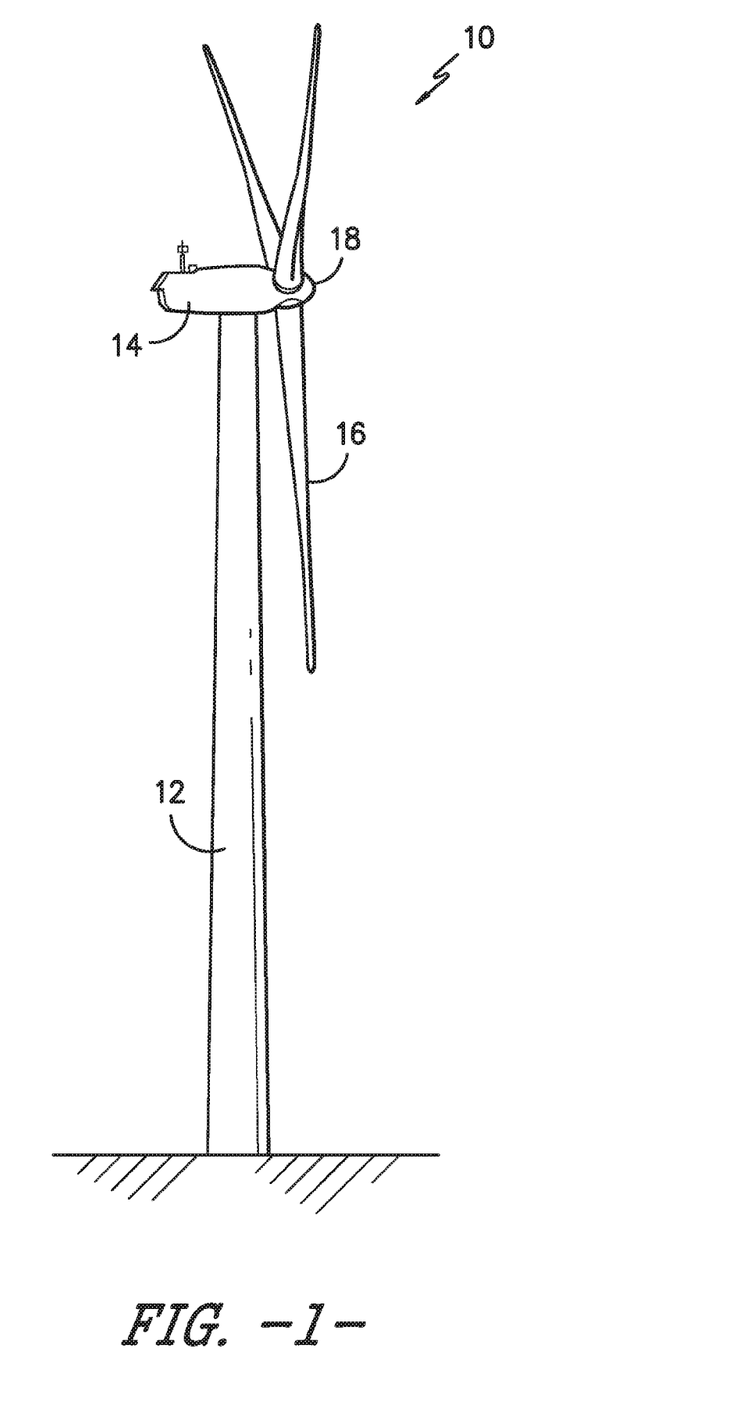
FIG. 1 illustrates a perspective view of a conventional wind turbine.

Referring now to the drawings, FIG. 1 illustrates perspective view of a wind turbine 10 of conventional construction. As shown, the wind turbine 10 includes a tower 12 with a nacelle 14 mounted thereon. A plurality of rotor blades 16 are mounted to a rotor hub 18, which is, in turn, connected to a main flange that turns a main rotor shaft. The wind turbine power generation and control components are housed within the nacelle 14. It should be appreciated that the wind turbine 10 of FIG. 1 is provided for illustrative purposes only to place the present invention in an exemplary field of use. Thus, one of ordinary skill in the art should understand that the invention is not limited to any particular type of wind turbine configuration.

Figure 2:
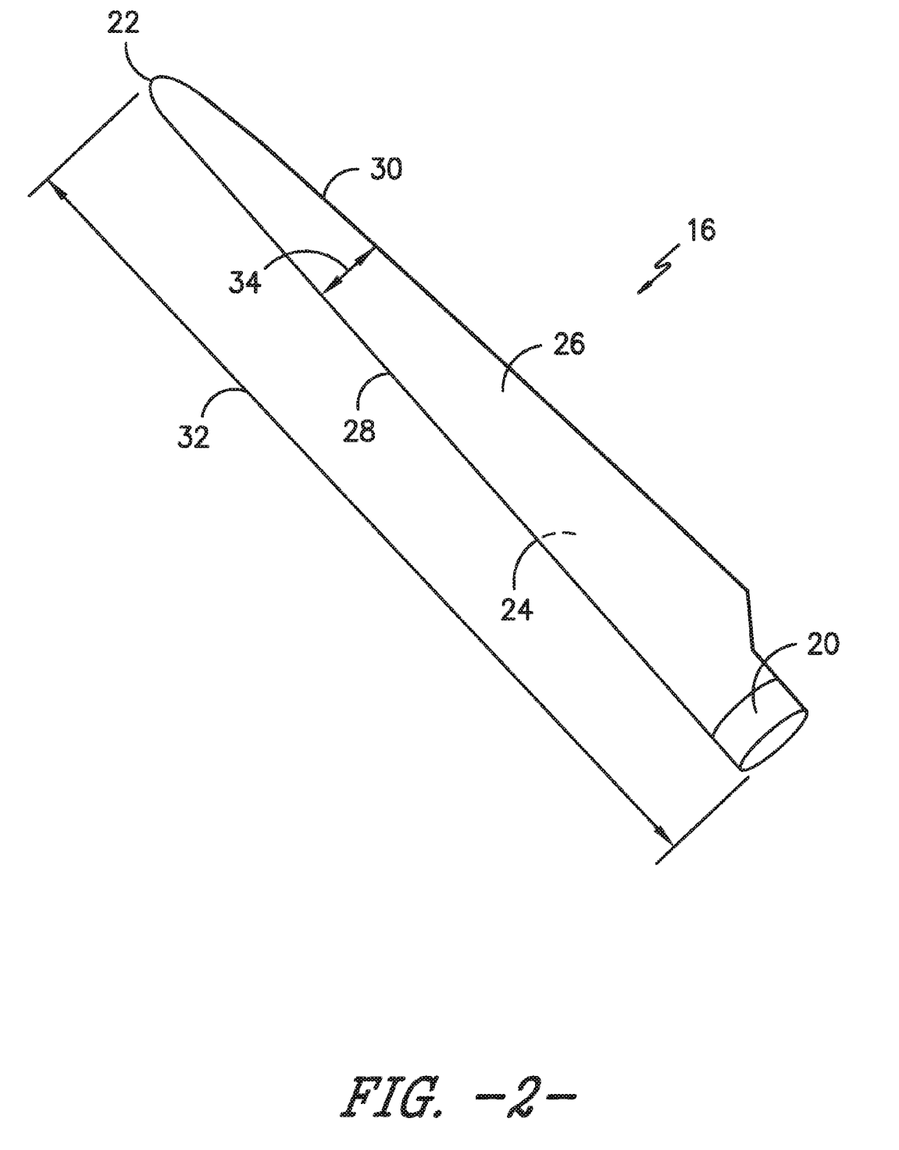
FIG. 2 illustrates a perspective view of a conventional rotor blade.

Referring now to FIG. 2, there is illustrated a perspective view of a rotor blade 16 of conventional construction. As shown, the rotor blade 16 includes a blade root 20 configured for mounting the rotor blade 16 to a mounting flange (not shown) of the wind turbine hub 18 (FIG. 1) and a blade tip 22 disposed opposite the blade root 20. The rotor blade 16 may also include a pressure side 24 and a suction side 26 extending between a leading edge 28 and a trailing edge 30. Additionally, the rotor blade 16 may include a span 32 defining the total length between the blade root 20 and the blade tip 22 and a chord 34 defining the total length between the leading edge 28 and the trailing edge 30. As is generally understood, the chord 34 may vary in length with respect to the span 32 as the rotor blade 16 extends from the blade root 20 to the blade tip 22.

Additionally, the rotor blade 16 may define any suitable aerodynamic profile. Thus, in several embodiments, the rotor blade 16 may define an airfoil shaped cross-section. For example, the rotor blade 16 may be configured as a symmetrical airfoil or a cambered airfoil. Further, the rotor blade 16 may also be aeroelastically tailored. Aeroelastic tailoring of the rotor blade 16 may entail bending the blade 16 in a generally chordwise direction and/or in a generally spanwise direction. The chordwise direction generally corresponds to a direction parallel to the chord 34 defined between the leading and trailing edges 28, 30 of the rotor blade 16. Additionally, the spanwise direction generally corresponds to a direction parallel to the span 32 of the rotor blade 16. Aeroelastic tailoring of the rotor blade 16 may further entail twisting of the blade 16, such as by twisting the blade 16 in a generally chordwise or spanwise direction.

As indicated above, the present disclosure is generally directed to methods of manufacturing wind turbine rotor blades having one or more structural reinforcement inserts and also rotor blades produced in accordance with such methods. Accordingly, one embodiment of a method 100 for manufacturing such a rotor blade 200 will generally be described with reference to FIG. 3 and will be explained in greater detail with reference to FIGS. 4-12.

Figure 3:
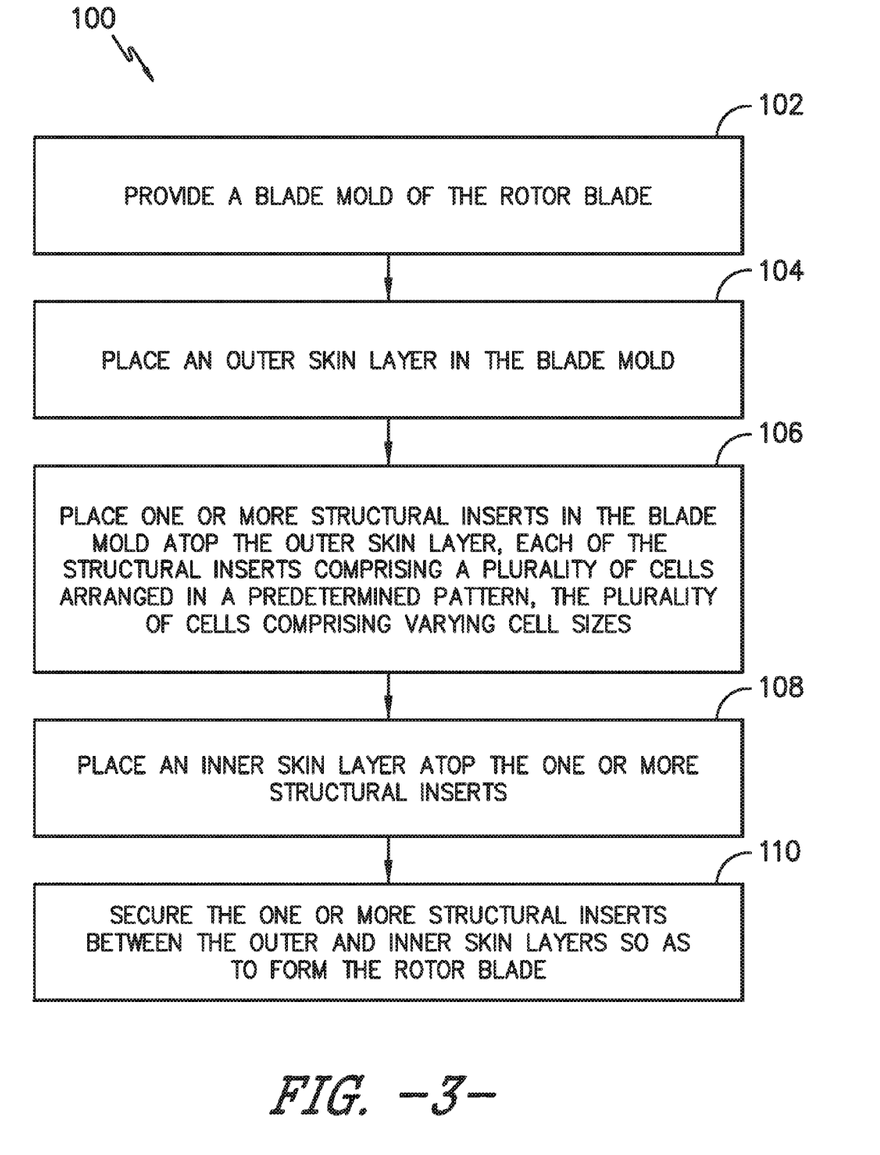
FIG. 3 illustrates a flow diagram of one embodiment of a method of manufacturing a rotor blade according to the present disclosure.
Figure 4:
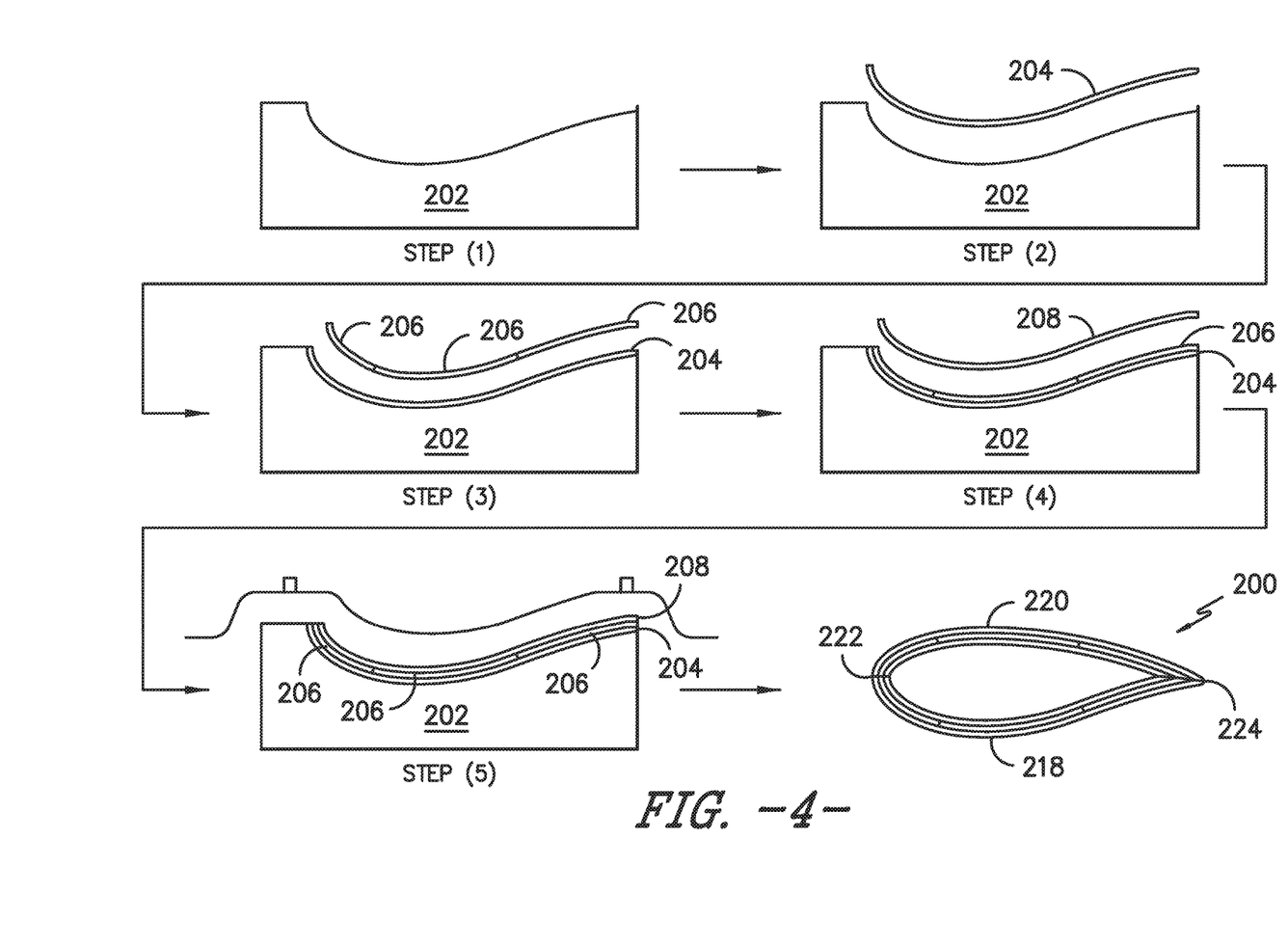
FIG. 4 illustrates a process flow diagram of one embodiment of a manufacturing process of a rotor blade according to the present disclosure.
Figure 5:
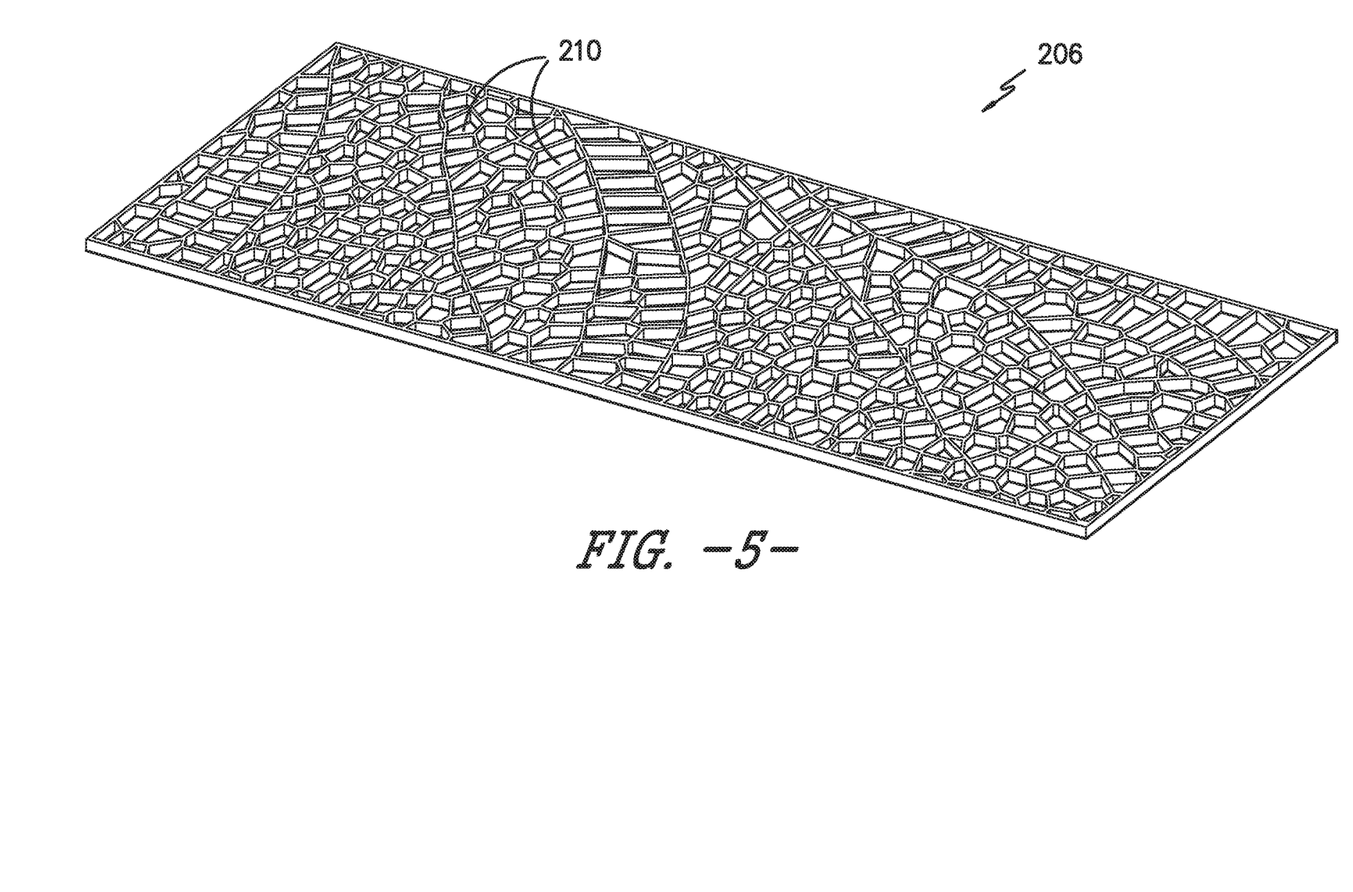
FIG. 5 illustrates a perspective view of one embodiment of a structural insert having varying-sized cells according to the present disclosure.

Referring to FIG. 3, as shown at 102, the method 100 includes providing a blade mold 202 of the rotor blade 200 (e.g. as illustrated in FIG. 4 at STEP 1). As shown at 104, the method 100 includes placing an outer skin layer 204 in the blade mold 200 (e.g. as illustrated in FIG. 4 at STEP 2). Thus, the outer skin layer 204 generally forms the exterior surface of the rotor blade 200. As shown at 106, the method 100 also includes placing one or more structural inserts 206 in the blade mold 202 atop the outer skin layer 204. For example, as shown in FIG. 4 at STEP 3, the method 100 includes placing a plurality of structural inserts 106 in the blade mold 200 atop the outer skin layer 204. It should be understood that the number and/or location of the structural inserts 206 can be determined as a function of the loading experienced by the rotor blade 200.

Figure 6:
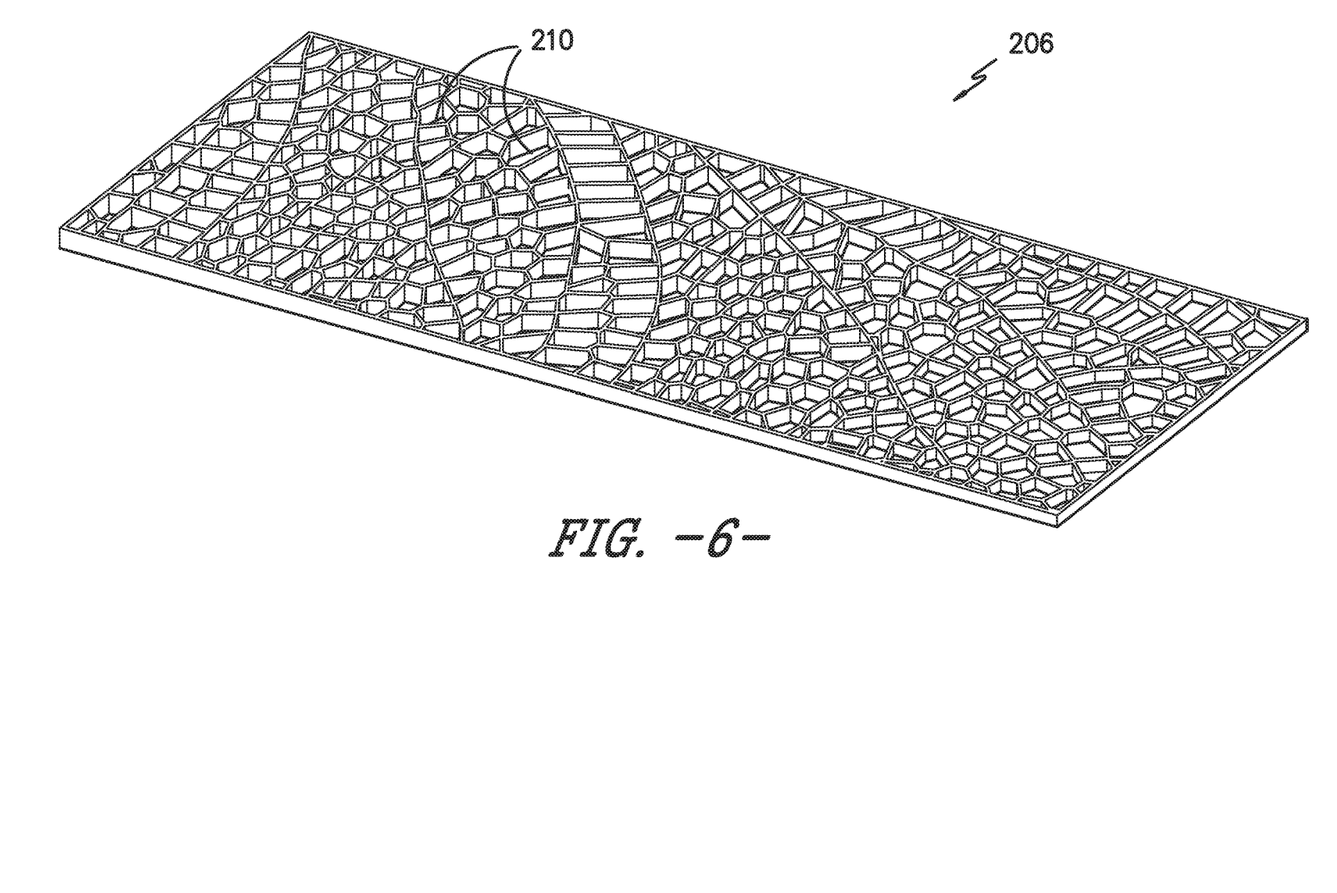
FIG. 6 illustrates a perspective view of one embodiment of a structural insert having varying-sized cells according to the present disclosure.
Figure 7:
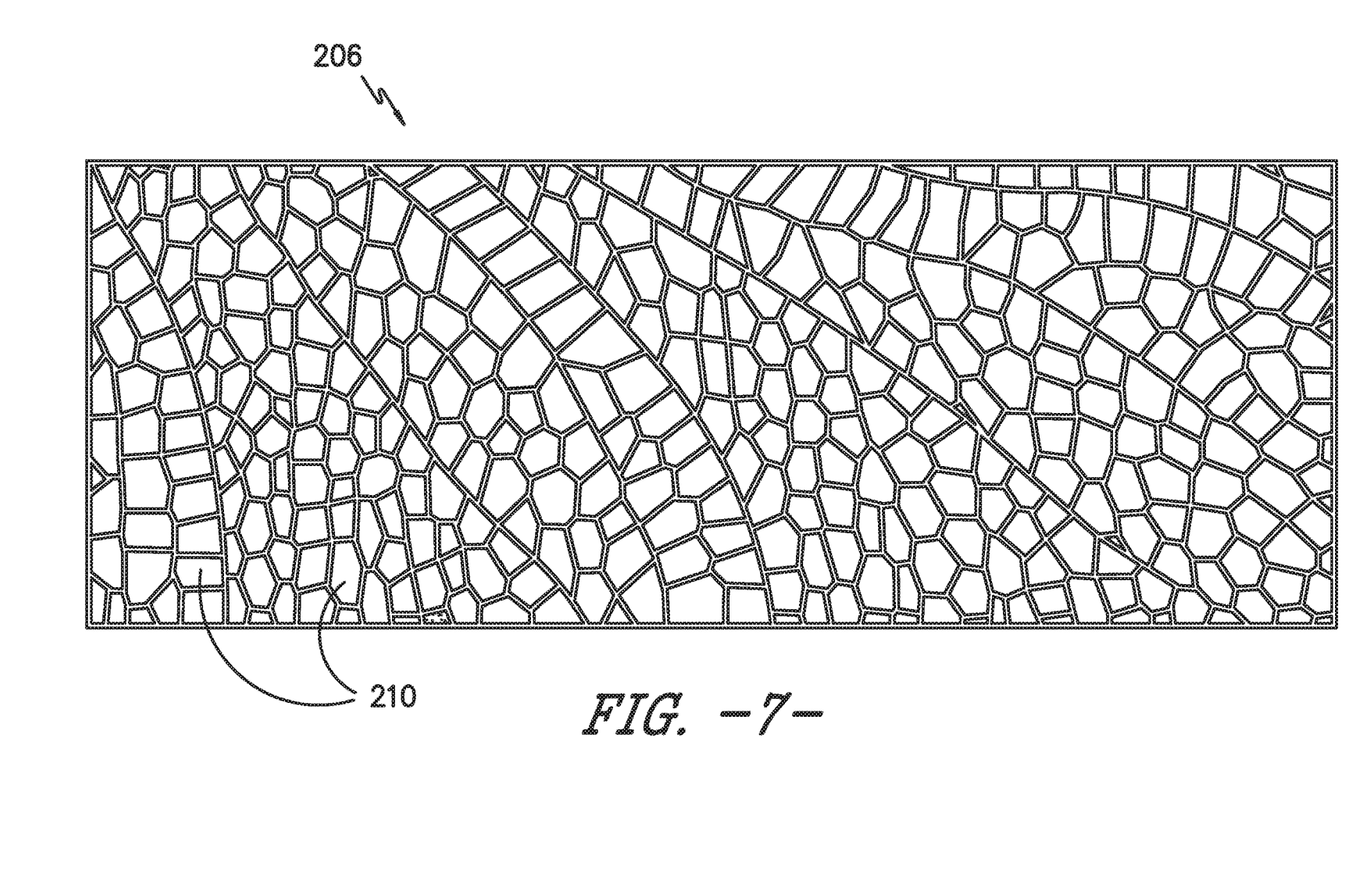
FIG. 7 illustrates a top view of the structural insert of FIG. 5.
Figure 10:
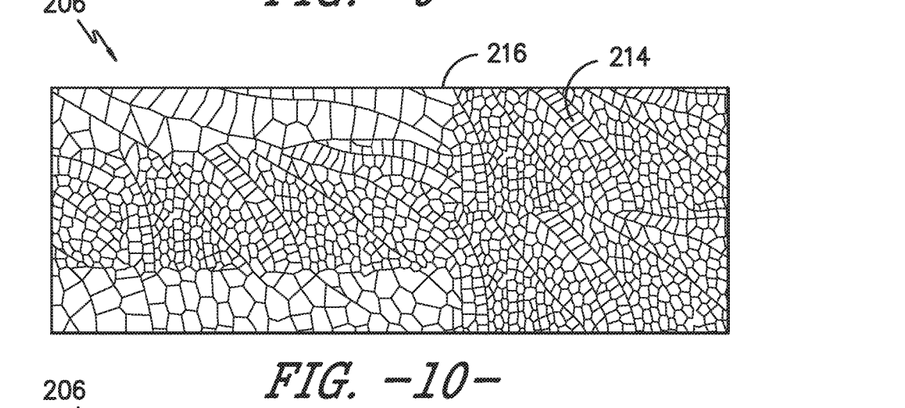
FIG. 10 illustrates a top view of yet another embodiment of a structural insert having varying-sized cells according to the present disclosure.
Figure 11:
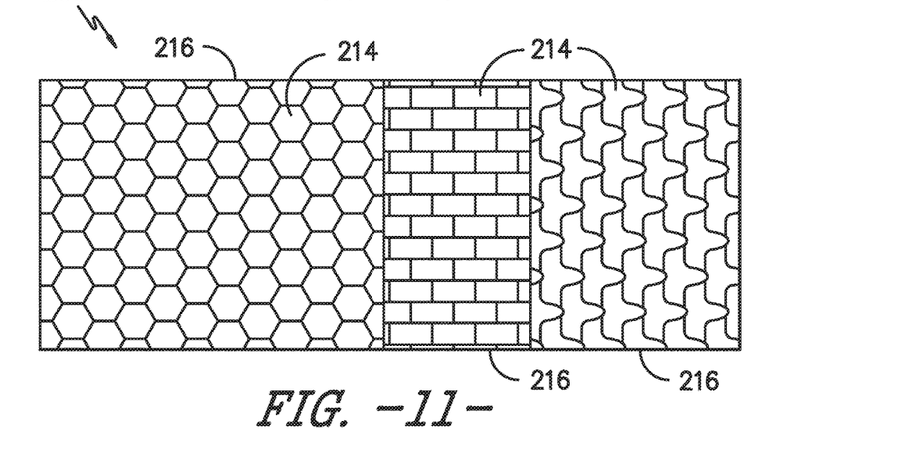
FIG. 11 illustrates a top view of still another embodiment of a structural insert having varying-sized cells according to the present disclosure.
Figure 12:
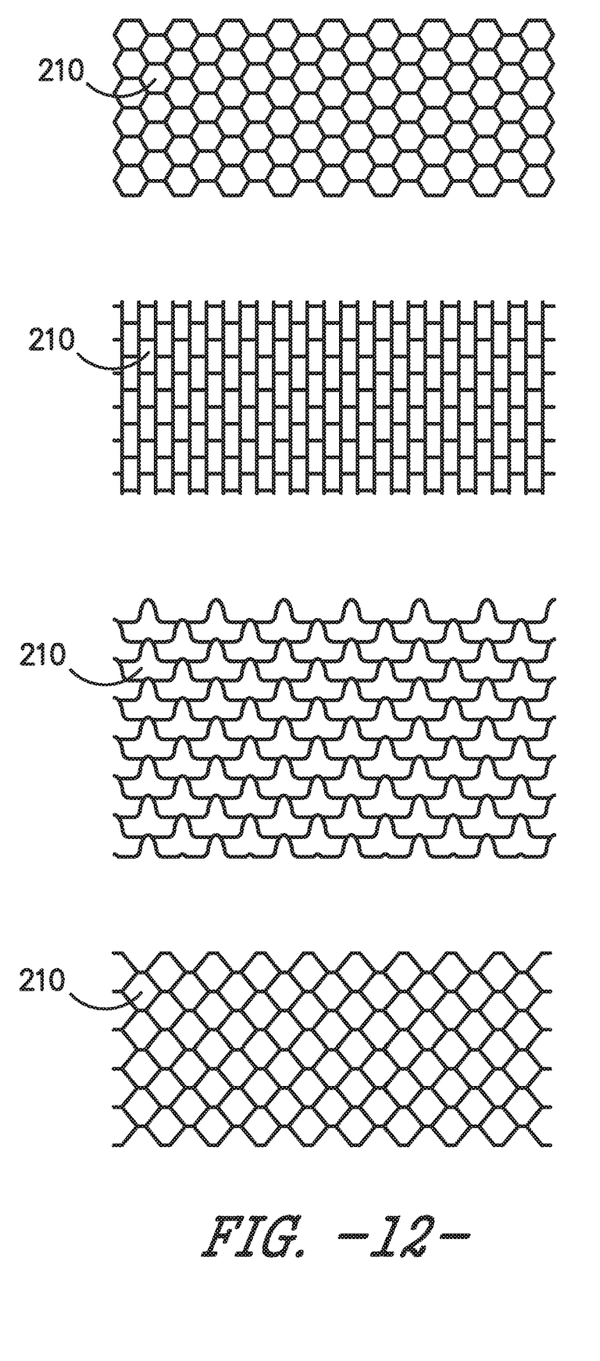
FIG. 12 illustrates various views of example cross-sectional shapes of individual cells of a structural insert for a rotor blade according to one embodiment of the present disclosure.

Referring now to FIGS. 5-12, the structural inserts 206 of the present disclosure are generally characterized as structural reinforcement panels having a plurality of cells 210 arranged in a predetermined pattern 214. Further, as shown, the cells 210 of a single structural insert 206 have varying cell sizes, i.e. varying cross-sectional areas and/or volumes. Thus, as shown in FIG. 6, a thickness of the structural insert 206 may vary along a length thereof. As such, the cells 210 of the structural inserts 206 may be tailored according to a desired load of the rotor blade 200. In addition, as shown in FIGS. 5-11, the predetermined pattern 214 may include any suitable pattern having cells 210 of varying sizes. For example, as shown, the predetermined pattern 214 may have a dragon fly pattern (FIGS. 5, 7, and 10), a hexagonal pattern (FIGS. 9 and 11), a square pattern, a rectangular pattern (FIG. 11), a flex core pattern (FIG. 11), a random pattern, or similar. Thus, the individual cells 210 may have any unique cross-sectional shape. For example, as shown in FIG. 12, the cross-sectional shapes of the individual cells 210 may include a hexagon, a rectangle, a square, a flex-core, a diamond, a triangle, or any other suitable shape.

Figure 9:
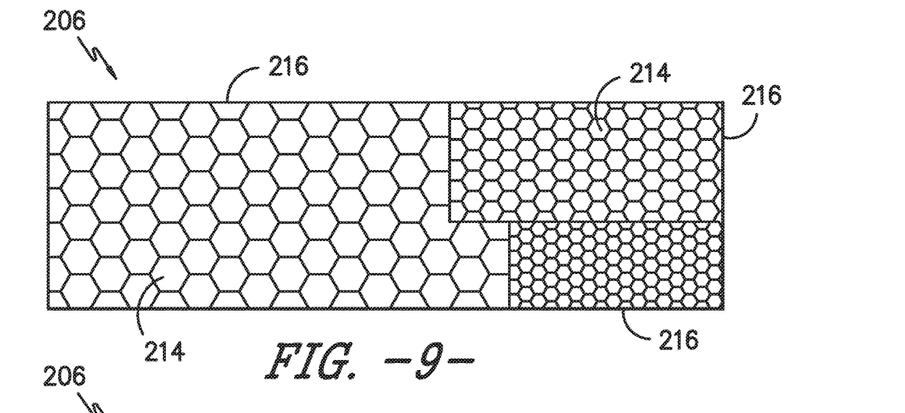
FIG. 9 illustrates a top view of another embodiment of a structural insert having varying-sized cells according to the present disclosure.

More specifically, in certain embodiments, as shown in FIG. 9, the structural inserts 106 of the present disclosure may be formed of multiple panels 216 joined together (e.g. three panels 216), with each panel 216 having matching predetermined patterns of a different cell size. For example, as shown in FIGS. 9 and 10, the plurality of cells 210 of at least one of the panels 216 of the structural inserts 206 may be larger than the plurality of cells 210 of another structural panel 216. Alternatively, as shown in FIG. 11, the structural inserts 206 of the present disclosure may be formed of multiple panels 216 joined together, with each panel 216 having a different predetermined pattern. More specifically, as shown, three panels 216 are joined together and include three different patterns, i.e. a hexagonal pattern, a rectangular pattern, and a flex-core pattern. In addition, the flex-core pattern or similar is particularly useful when constructing areas of the rotor blade 16 having a bend or curve, as such shapes are particularly flexible. Such structural inserts 206 thus have cells 210 of varying sizes and shapes. In addition, as shown in FIG. 10, the structural inserts 206 of the present disclosure may be formed of a single panel 216 having the same pattern but with multiple cell sizes. More specifically, as shown, the panel 216 includes multiple dragonfly patterns with multiple cell sizes. In further embodiments, the predetermined patterns 214 of the structural inserts 206 may include a combination of different and/or matching predetermined patterns so as to accommodate the varying loads of the rotor blade 200.

As such, the structural inserts 206 as described herein are configured to provide stiffness and/or strength (e.g., spanwise or flap-wise stiffness and/or strength) to the rotor blade 200 during operation of the wind turbine 10 and can be tailored as a function of location on the rotor blade shell. Thus, it should be appreciated that the structural inserts 206 may generally have any suitable shape, size, cross-section and/or configuration that permits the structural inserts 206 to function as described herein. For example, the method 100 may also include forming the structural insert(s) 206 via any suitable manufacturing process, such as for example, three-dimensional (3D) printing or similar and optionally filling the cells 210 of the 3D part with a filler material 212. In addition, the structural insert(s) 206 may be formed from any suitable material, including for example, a relatively stiff and/or durable material. For example, in certain embodiments, the structural insert(s) 206 may be constructed from a glass fiber reinforced polymer (GFRP), a thermoset material, a thermoplastic material, metals (e.g., aluminum), wood or any other suitable materials or combinations of materials which are capable of withstanding the loading that typically occurs in the rotor blade 200 during operation of a wind turbine 10. More specifically, in certain embodiments, the structural insert(s) may be constructed of engineered thermoplastics, acrylonitrile butadiene styrene (ABS), polycarbonate (PC), and/or commodity plastics like polyethylene, polypropylene, or similar. In addition, the structural insert(s) may be fiber reinforced or particle reinforced.

In addition, the structural insert(s) 206 may be configured at any suitable location of the rotor blade 200, such as lengthwise within the rotor blade 200 along at least a portion of the span of the rotor blade 200. More specifically, the structural inserts 206 may be configured to extend lengthwise within the rotor blade 200 from generally adjacent the blade root to generally adjacent the blade tip. Further, the structural insert(s) 206 may be shaped into the desired profile using any suitable shaping means/method known in the art. Alternatively, the structural insert(s) 206 may be shaped using other suitable tools and/or equipment. For example, the structural insert(s) 206 may be shaped using various machining processes and/or cutting tools (e.g., knives, saws and the like), grinding/sanding equipment (e.g., electrical grinders, electrical sanders, sand paper and the like) and/or any other suitable tools/equipment known in the art.

Figure 8:
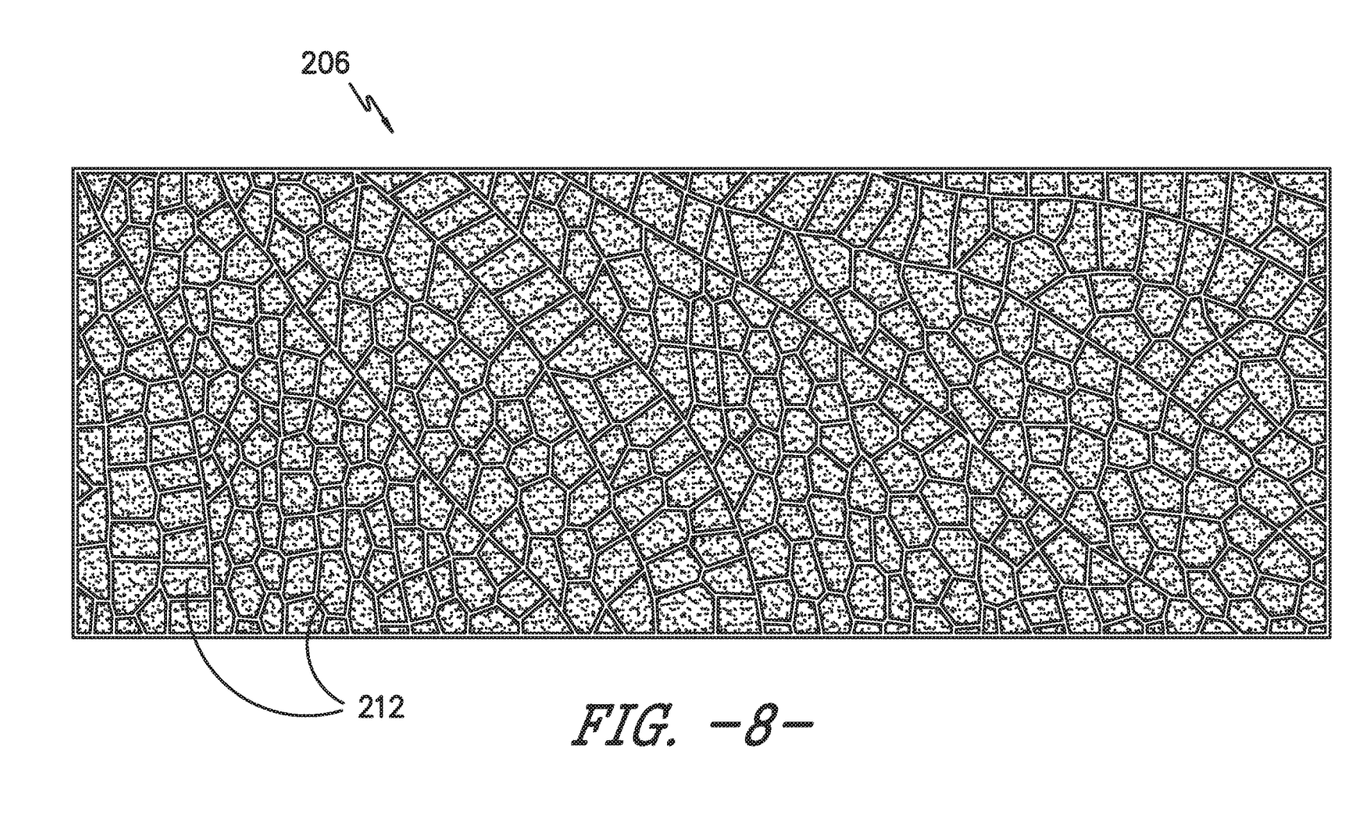
FIG. 8 illustrates a perspective view of another embodiment of a structural insert having varying-sized cells filled with a filler material according to the present disclosure.

In further embodiments, the method 100 may also include filling one or more of the plurality of cells 210 with a filler material 212, e.g. as shown in FIG. 8. In addition, the structural inserts 206 may be placed into the mold as an open-cell insert and subsequently filled with a filler material 212, as described herein. Alternatively, the structural inserts 206 may be placed into the mold as a preformed component, i.e. already including a filler material 212 within the cells 210. In particular, the filler material 212 may be configured to extend within the cells 210 so as to occupy or fill at least a portion of the inner volume of the cells 210. For example, the filler material 212 may be configured to occupy greater than 50% of the inner volume of the cells 210, such as greater than 75% of the inner volume or greater than 85% of the inner volume or greater than 95% of the inner volume of the cells 210.

It should be appreciated that the filler material 212 may generally comprise any suitable material. For example, in several embodiments of the present subject matter, the filler material 208 may include a relatively lightweight, low-density material. Thus, in a particular embodiment, the filler material 212 may comprise a low-density foam or core material. Suitable low-density foam materials may include, but are not limited to, polystyrene foams (e.g., expanded polystyrene foams), polyurethane foams, other foam rubbers/resin-based foams and various other open cell and closed cell foams. Alternatively, the filer material 212 may include other suitable low-density materials, such as balsa wood, cork and the like.

Referring back to FIG. 3, as shown at 108, the method 100 may also include placing an inner skin layer 208 atop the one or more structural inserts 206 in the blade mold 200 (e.g. as shown in FIG. 4 at STEP 4). Thus, the inner skin layer 208 generally forms the interior surface of the rotor blade 200. It should be appreciated that the outer and inner layers 204, 208 may generally comprise any suitable material and may be formed using any suitable method and/or process. For example, in one embodiment, the outer and inner layers 204, 208 may include a laminate composite material (e.g., a fiber-reinforced laminate) using a hand layup process or any other suitable laminate forming method. In another embodiment, the outer and inner layers 204, 208 may comprise a spray-on surface coating, such as a polyurethane elastomeric spray-on compound. In a further embodiment, the outer and inner layers 204, 208 may include a thermoplastic-based coating formed using a heat-shrink wrapping process and/or a heat-shrink tubing process.

Further, as shown at 110, the method 100 includes securing the structural insert(s) 206 between the outer and inner skin layers 204, 208 so as to form the rotor blade 200. More specifically, as shown at STEP 5 of FIG. 4, the step of securing the structural insert(s) 206 between the outer and inner skin layers 204, 208 so as to form the rotor blade 200 may include infusing the structural insert(s) 206 between the outer and inner skin layers 204, 208 via vacuum infusion (e.g. using a resin material) so as to form the rotor blade 200, e.g. where the outer and inner skin layers are dry fabrics. Alternatively, the step of securing the structural insert(s) 206 between the outer and inner skin layers 204, 208 may include heat curing the structural inserts 206 between the outer and inner skin layers 204, 208, e.g. where the outer and inner skin layers 204, 208 are pre-preg materials. In still another embodiment, the step of securing the structural insert(s) 206 between the outer and inner skin layers 204, 208 may include utilizing mechanical components (e.g. adhesive and/or fasteners) to secure the structural inserts 206 between the outer and inner skin layers 204, 208, Further, as shown in the illustrated embodiment, the blade mold 202 may be a mold for a blade shell half. In additional embodiments, the blade mold may be any suitable mold, including a blade mold of the entire rotor blade or a partial blade mold. Thus, the shell halves may be subsequently joined together via the leading and trailing edges 222, 224 using any suitable means, e.g. such as vacuum infusion and/or heat curing. As such, similar to the rotor blade 16 described above, the disclosed rotor blade 200 may include a pressure side 218 and a suction side 220 extending between the leading and trailing edges 222, 224 (FIG. 4). Moreover, as indicated above, the rotor blade 200 may generally define an aerodynamic profile. For example, in several embodiments, the structural insert(s) 206 and the outer and inner layers 204, 208 may be configured such that the rotor blade 200 defines an airfoil shaped cross-section, such as a symmetrical or cambered airfoil. The rotor blade 200 may also be configured to have additional aerodynamic features. For example, in one embodiment, the rotor blade 200 may be aeroelastically tailored, such as by being bent and/or twisted in a generally chord-wise direction and/or in a generally span-wise direction. It should be appreciated that, although the various method elements illustrated in FIG. 3 are shown in a particular order, the elements may generally be performed in any sequence and/or order consistent with the disclosure provided herein.

Figure 13:
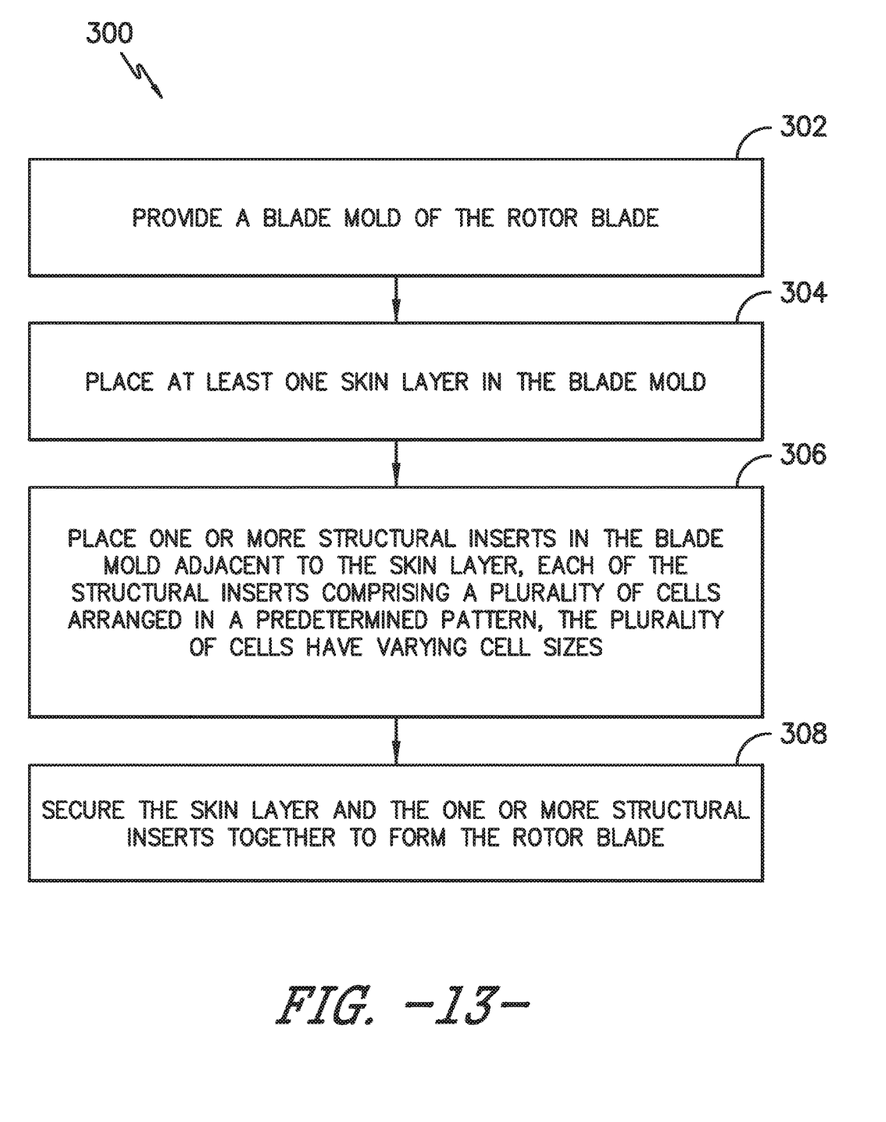
FIG. 13 illustrates a flow diagram of another embodiment of a method of manufacturing a rotor blade according to the present disclosure.

Referring now to FIG. 13, a flow diagram of another embodiment of a method 300 of manufacturing a rotor blade (e.g. rotor blade 200) for a wind turbine (e.g. the wind turbine 10 of FIG. 1) is illustrated. As shown at 302, the method 300 includes providing a blade mold of the rotor blade. As shown at 304, the method 300 includes placing at least one skin layer in the blade mold. As shown at 306, the method 300 includes placing one or more structural inserts in the blade mold adjacent to the skin layer. Each of the structural inserts includes a plurality of cells arranged in a predetermined pattern. Further, the cells have varying cell sizes. As shown at 308, the method 300 includes securing the skin layer and the one or more structural inserts together to form the rotor blade.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of manufacturing a rotor blade for a wind turbine, the method comprising:
    providing a blade mold of the rotor blade;
    placing an outer skin layer in the blade mold;
    placing a structural panel in the blade mold atop the outer skin layer, the structural panel comprising a plurality of cells arranged in a predetermined pattern, the plurality of cells comprising varying cell sizes within the structural panel when the structural panel is placed in the blade mold;
    placing an inner skin layer atop the structural panel; and,
    securing the structural panel between the outer and inner skin layers so as to form the rotor blade.

2. The method of claim 1, further comprising filling the plurality of cells with a filler material, wherein the filler material comprises a low-density foam material.

3. The method of claim 1, wherein the outer and inner skin layers comprise at least one of a dry fabric or a pre-preg material.

4. The method of claim 1, wherein the predetermined pattern comprises at least one of a dragon fly pattern, a hexagonal pattern, a square pattern, a rectangular pattern, a flex core pattern, or a random pattern.

5. The method of claim 1, further comprising forming structural panel via three-dimensional (3D) printing.

6. The method of claim 1, wherein the structural panel is constructed of at least one of a glass fiber reinforced polymer (GFRP), a thermoset material, a thermoplastic material, or a metal.

7. The method of claim 1, further comprising placing a plurality of structural panels in the blade mold atop the outer skin layer, each of the plurality of structural panels comprising a different predetermined pattern.

8. The method of claim 7, wherein the plurality of cells of at least one of the plurality of structural panels is larger than the plurality of cells of another structural panel.

9. The method of claim 7, wherein at least one of the plurality of structural panels comprises a varying thickness along a length thereof.

10. The method of claim 1, further comprising placing a plurality of structural panels in the blade mold atop the outer skin layer, each of the plurality of structural panels comprising matching predetermined patterns.

11. The method of claim 1, further comprising placing a plurality of structural panels in the blade mold atop the outer skin layer, the plurality of structural panels comprising a combination of different and matching predetermined patterns.

12. The method of claim 1, wherein securing the structural panel between the outer and inner skin layers further comprises at least one of infusing the structural panel between the outer and inner skin layers via vacuum infusion, heat curing the structural panel between the outer and inner skin layers, or mechanically fastening the structural panel between the outer and inner skin layers.

13. A method of manufacturing a rotor blade for a wind turbine, the method comprising:

providing a blade mold of the rotor blade;

placing at least one skin layer in the blade mold;

placing a structural panel in the blade mold adjacent to the skin layer, the structural panel comprising a plurality of cells arranged in a predetermined pattern, the plurality of cells comprising varying cell sizes within the structural panel when the structural panel is placed in the blade mold; and, securing the skin layer and the structural panel together to form the rotor blade.

14. The method of claim 13, wherein securing the skin layer and the structural panel together to form the rotor blade further comprises at least one of infusing the structural panel to the skin layer via vacuum infusion, heat curing the structural panel to the skin layer, or mechanically fastening the structural panel to the skin layer.

* * * * *